United States Patent [19]

Ohtsuka et al.

[11] Patent Number: 5,606,432
[45] Date of Patent: Feb. 25, 1997

[54] IMAGE REPRODUCING SYSTEM

[75] Inventors: Shuichi Ohtsuka; Akira Yoda; Yoshinori Usami, all of Kanagawa-ken, Japan

[73] Assignee: Fuji Photo Film Co., Ltd., Kanagawa, Japan

[21] Appl. No.: 362,899

[22] Filed: Dec. 23, 1994

[30] Foreign Application Priority Data

Dec. 24, 1993 [JP] Japan .................................. 5-327339
Aug. 30, 1994 [JP] Japan .................................. 6-205255

[51] Int. Cl.⁶ ............................................. G03F 3/10
[52] U.S. Cl. ...................... 358/527; 358/501; 358/504; 358/533
[58] Field of Search ........................ 358/500, 501, 358/504, 518, 523, 527, 530, 533, 454, 456

[56] References Cited

U.S. PATENT DOCUMENTS

| | | | |
|---|---|---|---|
| 4,456,924 | 6/1984 | Rosenfeld | 358/536 |
| 4,916,545 | 4/1990 | Granger | 358/456 |
| 4,979,032 | 12/1990 | Alessi et al. | 358/527 |
| 5,381,246 | 1/1995 | Suzuki et al. | 358/527 |
| 5,420,979 | 5/1995 | Madden | 358/527 |

FOREIGN PATENT DOCUMENTS

| | | | |
|---|---|---|---|
| 0173032 | 3/1986 | European Pat. Off. | H04N 1/46 |
| 0209266 | 1/1987 | European Pat. Off. | H04N 1/46 |
| 6181543 | 6/1994 | Japan . | |

OTHER PUBLICATIONS

"Reference Manual for Postscript", 2nd Edition, published by ASCII Publishing Department with English Language Translation.

"Printing CIELab Imaging on CMYK Printing", SPIE vol. 1670. p. 316 (1992).

*Primary Examiner*—Edward L. Coles, Sr.
*Assistant Examiner*—Thomas L. Stoll
*Attorney, Agent, or Firm*—Sughrue, Mion, Zinn, Macpeak & Seas

[57] ABSTRACT

Image characteristics of a finally generated printed image that is reproduced from YMCK halftone dot percentage data from an image editor by an image output unit B are simulated highly accurately taking into account periodic noise and random noise, and the simulated image is outputted from an image output unit A. Specifically, the YMCK halftone dot percentage data from the image editor are converted into color image data corresponding to image characteristics of the image output unit B by an LUT combiner/converter, and periodic noise and random noise that can be produced by the image output unit B are applied to the color image data. The noise-applied color image data are then outputted from the image output unit A.

8 Claims, 11 Drawing Sheets

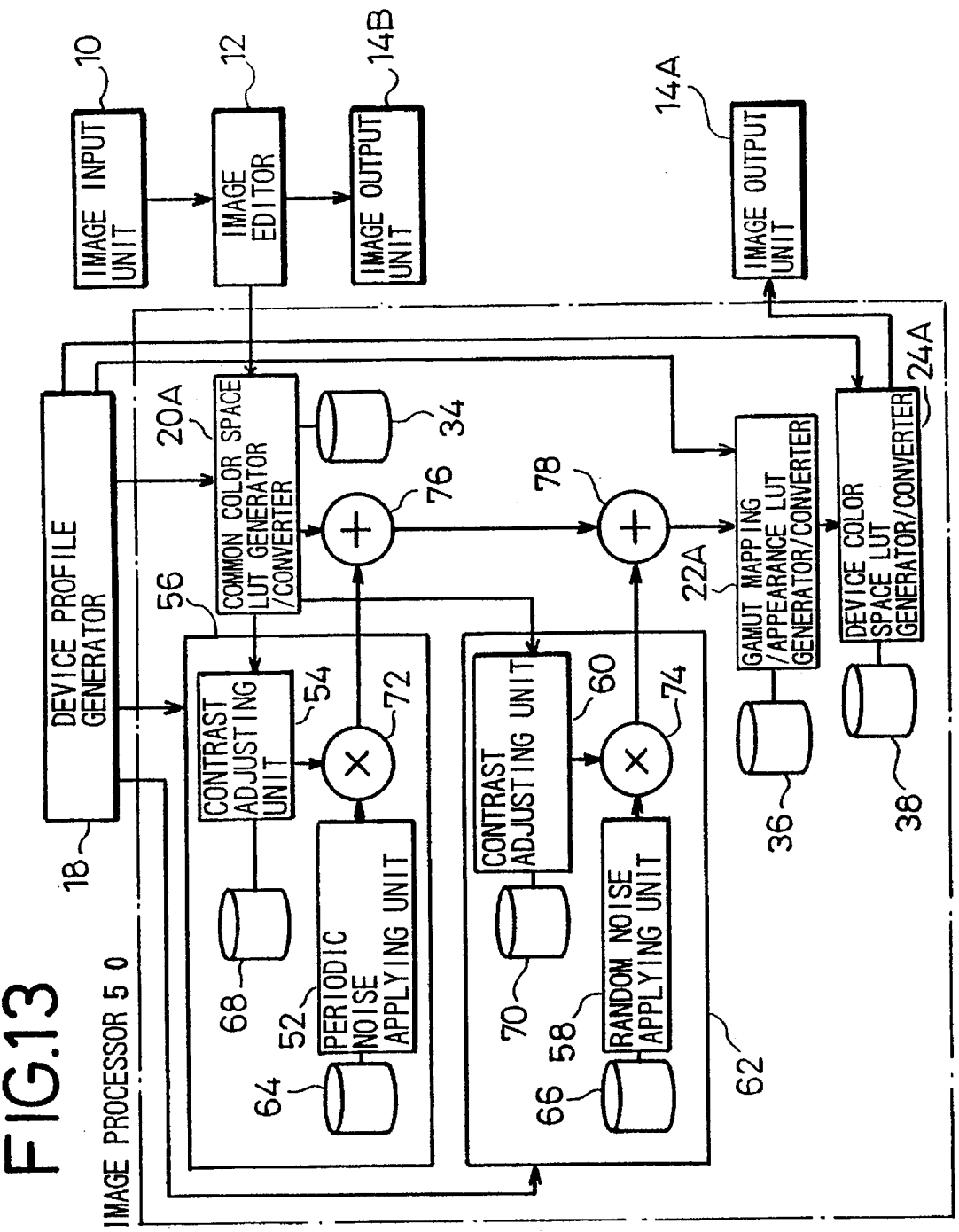

IMAGE REPRODUCING SYSTEM

BACKGROUND OF THE INVENTION

1. Field of the Invention

The present invention is directed to a color image reproducing system for predicting the appearance of a printed image prior to finally producing it with a simulated image reproduced on a monitor device whose appearance agrees highly accurately with the printed image by taking into account periodic and random noises introduced in the printed image due to characteristics of a printing device and an image to be printed.

2. Description of the Related Art

In recent years, there have widely been used printing systems for reading an image from an original document such as a photograph, a painting, or the like or processing image data supplied from an image input device and generating printed material using a film original plate or a press plate.

Such a printed material is produced through a number of processing steps. More specifically, color separation films of Y, M, C, K are generated on the basis of image data supplied from an image input device, and presensitized plates are exposed to color images through the color separation films. Then, the color images on the presensitized plates are developed, and the presensitized plates are set on a printing press to produce a printed material. The printed material which is finally produced depends on various printing conditions (output conditions) including the paper, inks, and water used, the type of the printing press, and the screen ruling and dot shape which are employed for the formation of dot-matrix images. In producing a printed image based on the above complex processing steps and conditions, it is important to generate a simulated image in advance by outputting processed image data on a CRT, a printer, or the like, to determine whether printing conditions to produce a printed image from the image data are appropriate or not based on the simulated image, and to adjust the conditions if necessary.

The simulated image is made equivalent to a printed image by colorimetrically equalizing the individual colors of the pixels of the simulated image to those of the printed image and equalizing optical characteristics depending upon the output method and resolution of output systems used, and the properties of a support layer for the printed image such as optical dispersion, surface reflections, etc.

The printed image generated by the printing press is represented as a continuous gradation image using halftone dots, and hence contains a rosette pattern or moiré characteristic of images formed from halftone dots. Images generated by ordinary printers or CRTs, however, do not contain such a rosette pattern or moiré as these images are continuous gradation images represented by density or luminance changes. Therefore, it is difficult to produce equal images with the printing press and the printer or CRT as generated images have different qualities because of different output methods used. Generally, the printing press which generates printed images and the printer or CRT which generates simulated images have different resolutions. Usually, the printer or CRT which generates simulated images have a resolution lower than the printing press which generates printed images. If the resolution and accuracy of the printer or CRT which generates simulated images are increased so as to be equivalent to those of the printing press, then the printer or CRT will be unduly expensive and specialized.

SUMMARY OF THE INVENTION

It is therefore an object of the present invention to provide a color image reproducing system which is capable of reproducing a simulated image on a monitor device whose appearance agrees highly accurately with an image on a printed material by taking into account periodic noise or random noise introduced in the printed image, without making an image reproducing arrangement unduly expensive or specialized.

To achieve the above object, there is provided in accordance with the present invention a color image reproducing system for predicting the appearance of a finally generated image with a simulated image thereof reproduced on a monitor device from processed image data prior to finally generating the image from the processed image data, comprising output condition storing means for storing selectable items of output conditions including an output method and an output medium to be set for an outputting device for outputting the finally generated image, and noise simulating process setting means for establishing a noise simulating process to reproduce noise characteristics of the finally generated image in the simulated image according to output conditions specified for the finally generated image, whereby to modify the processed image data, the simulated image being produced by setting a noise simulating process according to the output conditions specified in the output condition storing means and effecting the noise simulating process.

According to the present invention, the above-described system may further comprise image converting process setting means for establishing an image converting process to convert the processed image data to reproduce color characteristics of said finally generated image in said simulated image according to the output conditions specified for the finally generated image in said output condition storing means, the simulated image being produced by effecting the noise simulating process and converting process.

With the above arrangement, image characteristics such as periodic noise or random noise produced in a finally generated printed image are reproduced according to a noise simulating process based on output conditions including an output method and an output medium for the printed image, and image data are outputted as a simulated image with the reproduced image characteristics. Therefore, the printed image and the simulated image are equalized highly accurately to each other, and hence the finally generated printed image can be simulated with high accuracy. No special output device is required to equalize the printed image and the simulated image to each other, and any expensive device equivalent to an image output unit for outputting the finally generated printed image is not necessary.

Furthermore, because the density of an image that varies upon reproduction of the periodic noise or random noise can be adjusted depending on the image data, it is possible to obtain a highly accurate simulated image including the density.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 13 is a block diagram of a color image reproducing system according to a second embodiment of the present invention.

DETAILED DESCRIPTION OF THE PREFERRED EMBODIMENTS

Figure 1:
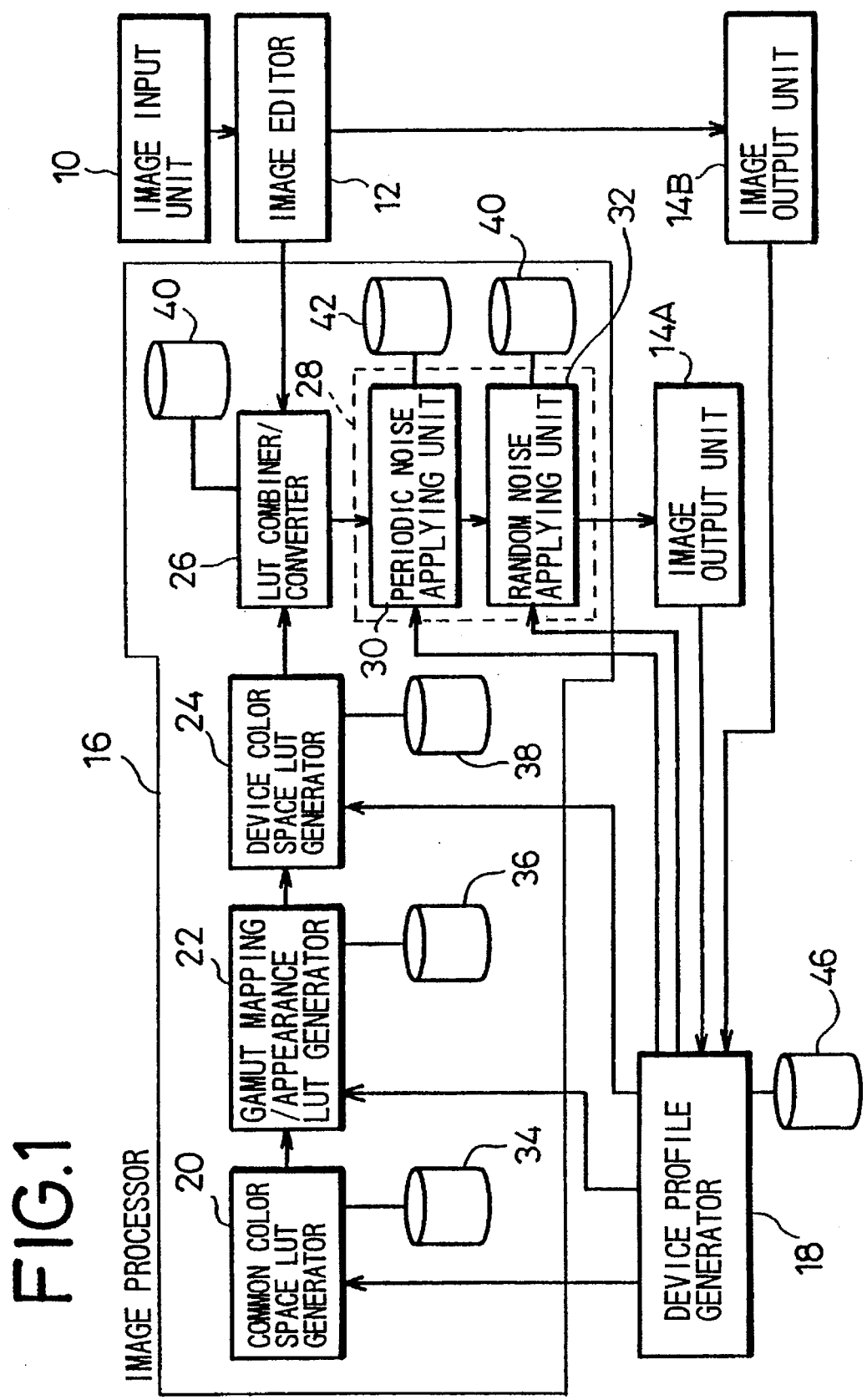
FIG. 1 is a block diagram of a color image reproducing system according to a first embodiment of the present invention.

As shown in FIG. 1, a color image reproducing system according to a first embodiment of the present invention generally comprises an image input unit 10 for reading color image data from a color original document or an external device, an image editor 12 for effecting image processing including an aesthetic process on the color image data thus read, an image output unit 14A for displaying or outputting an image simulated from the processed color image data on a CRT, a color printer, or the like, an image output unit 14B for outputting the processed color image as a printed image on a printed material, an image processor 16 for converting the color image data into color image data that can be handled by the image output unit 14A taking into account the output method of the image output device 14B and output conditions such as an output medium, etc., and a device profile generator 18 (output condition setting means) for generating a device profile group of device profiles which represent characteristics of the image output units 14A, 14B, and characteristics of a color reproduction process and color reproduction mediums including color materials, a support layer, phosphors, etc., and output conditions such as printing conditions, etc.

The image input unit 10 has three or more sensors having different spectral sensitivities for reading the image densities of pixels of a color original document. For example, the image input unit 10 may comprise a drum-type scanner for reading the image densities of pixels of a color original document mounted on a drum in synchronism with rotation of the drum, or a flatbed scanner for reading the image densities of pixels of a color original document with either a line sensor composed of a single array or a plurality of arrays of photoelectric transducers or a two-dimensional sensor composed of a two-dimensional matrix of photoelectric transducers.

The image editor 12 effects image processing including an aesthetic process on the color image data from the image input unit 10 to generate YMCK halftone dot percentage data supplied to the image output unit 14B.

The image output unit 14B produces Y, M, C, K color separation films for generating presensitized plates to produce a printed material, based on the YMCK halftone dot percentage data supplied as color image data from the image editor 12, then generates presensitized plates from the Y, M, C, K color separation films, and produces a printed material from the presensitized plates. The image output unit 14B includes a printing press. The image output unit 14A may comprise a CRT, a color printer, or the like as a monitor device for displaying or outputting a simulated color image having the same color representation and image quality as the printed material generated by the image output unit 14B.

The image processor 16 comprises a common color space conversion table (hereinafter referred to as an "LUT") generator 20 for generating a common color space LUT for converting the YMCK halftone dot percentage data supplied as color image data from the image editor 12 into color image data in a common color space such as of an XYZ colorimetric system, a gamut mapping/appearance LUT generator 22 for generating a gamut mapping/appearance LUT for compressing or converting a gamut mapping of the image input unit 10 in the common color space into a gamut mapping in the image output unit 14B, and making appearance adjustments depending on the difference between observing conditions, a device color space LUT generator 24 for generating a device color space LUT for converting the color image data in the common color space into color image data in the device color space of the image output unit 14A, an LUT combiner/converter 26 for generating a combined LUT composed of all or some of the LUTs generated by the common color space LUT generator 20, the gamut mapping/appearance LUT generator 22, and the device color space LUT generator 24, and converting the color image data based on the generated combined LUT, and a noise simulator 28 (noise simulating process setting means) for modifying the color image data converted by the LUT combiner/converter 26 for image characteristics which are to appear in a printed image. The noise simulator 28 comprises a periodic noise applying unit 30 for applying periodic noise such as a moiré pattern, a rosette pattern, or the like of a printed image to the color image data, and a random noise applying unit 32 for applying random noise produced due to the output characteristics of a printing press to the color image data.

The common color space LUT generated by the common color space LUT generator 20, the gamut mapping/appearance LUT generated by the gamut mapping/appearance LUT generator 22, the device color space LUT generated by the specific color space LUT generator 24, and the combined LUT generated by the LUT combiner/converter 26 are stored respectively in data files 34, 36, 38, 40. The periodic noise applying unit 30 establishes a simulated periodic noise table and the random noise applying unit 32 establishes a simulated random noise table, and the simulated periodic noise table and the simulated random noise table are stored respectively in data files 42, 44. The LUT combiner/converter 26 combines LUTs generated by the LUT generators 20, 22, 24, and converts color image data read by the image input unit 10 into color image data using the combined LUT and outputs the color image data to the noise simulator 28.

The common color space is a color space composed of data not depending on the input and output units and the output medium, such as a CIE-XYZ colorimetric system, an L*a*b* colorimetric system, an YCC colorimetric system which can uniquely be converted mathematically to and from the CIE-XYZ colorimetric system or the L*a*b* colorimetric system, an YIQ colorimetric system, or an RGB colorimetric system representing the phosphors of a display monitor such as a CRT or the like. It is therefore possible to carry out desired image processing in the common color space without concern over the input and output units and the output medium. The device color space is a color space composed of particular data handled by the image input unit 10 and the image output unit 14A.

The device profile generator 18 has measuring units for measuring various physical characteristics as desired, establishes color space data conversion formulas, relationship formulas and parameters used in the data processing in the image processor 16 as a device profile group, and stores the device profile group in a data file 36.

Figure 2:
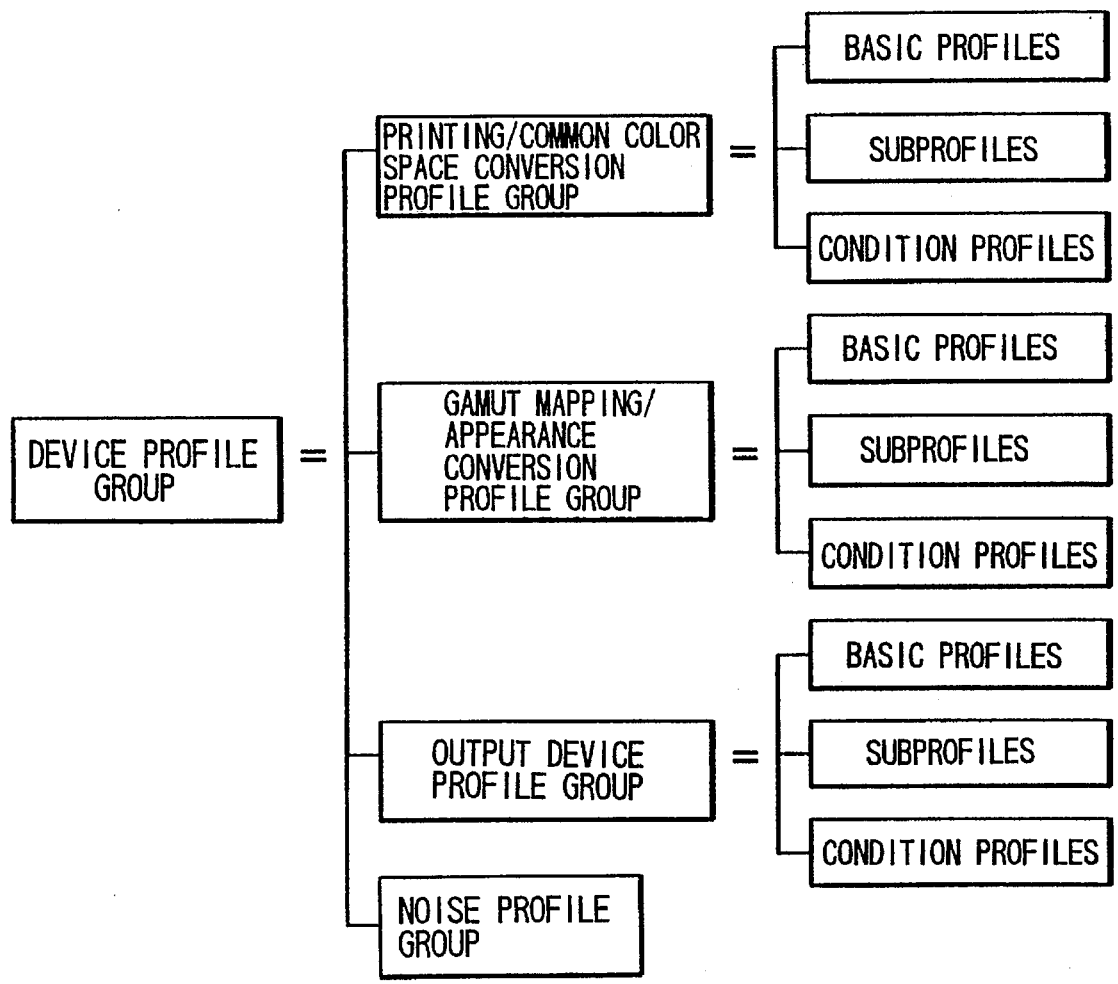
FIG. 2 is a diagram of a device profile group in the color image reproducing system shown in FIG. 1.

The device profile group is a collection of profiles representing, in a common data format, color reproduction processes in the image output devices 14A, 14B, environmental conditions in which they are used, physical factors and characteristics of materials of a color original document and a recording medium, and formulas which couple these data. Basically, as shown in FIG. 2, the device profile group includes a printing/common color space conversion profile group for generating a common color space LUT for converting YMCK halftone dot percentage data supplied from the image editor 12 into color image data in a common color space such as of a CIE-XYZ colorimetric system, an L*a*b* colorimetric system, or the like while taking various printing conditions into account, a gamut mapping/appearance conversion profile group for generating a gamut mapping/appearance LUT for converting the gamut mapping and appearance of the color image data in the common color space into a desired gamut mapping and appearance while taking into account the gamut mapping and appearance in the image output unit 14A, an output device profile group for converting the color image data in the common color space into color image data in the device color space in the image output unit 14A, and a noise profile group for generating data corresponding to periodic noise and random noise. Each of the above profile groups except the noise profile group includes basic profiles, subprofiles, and condition profiles.

Figure 3:
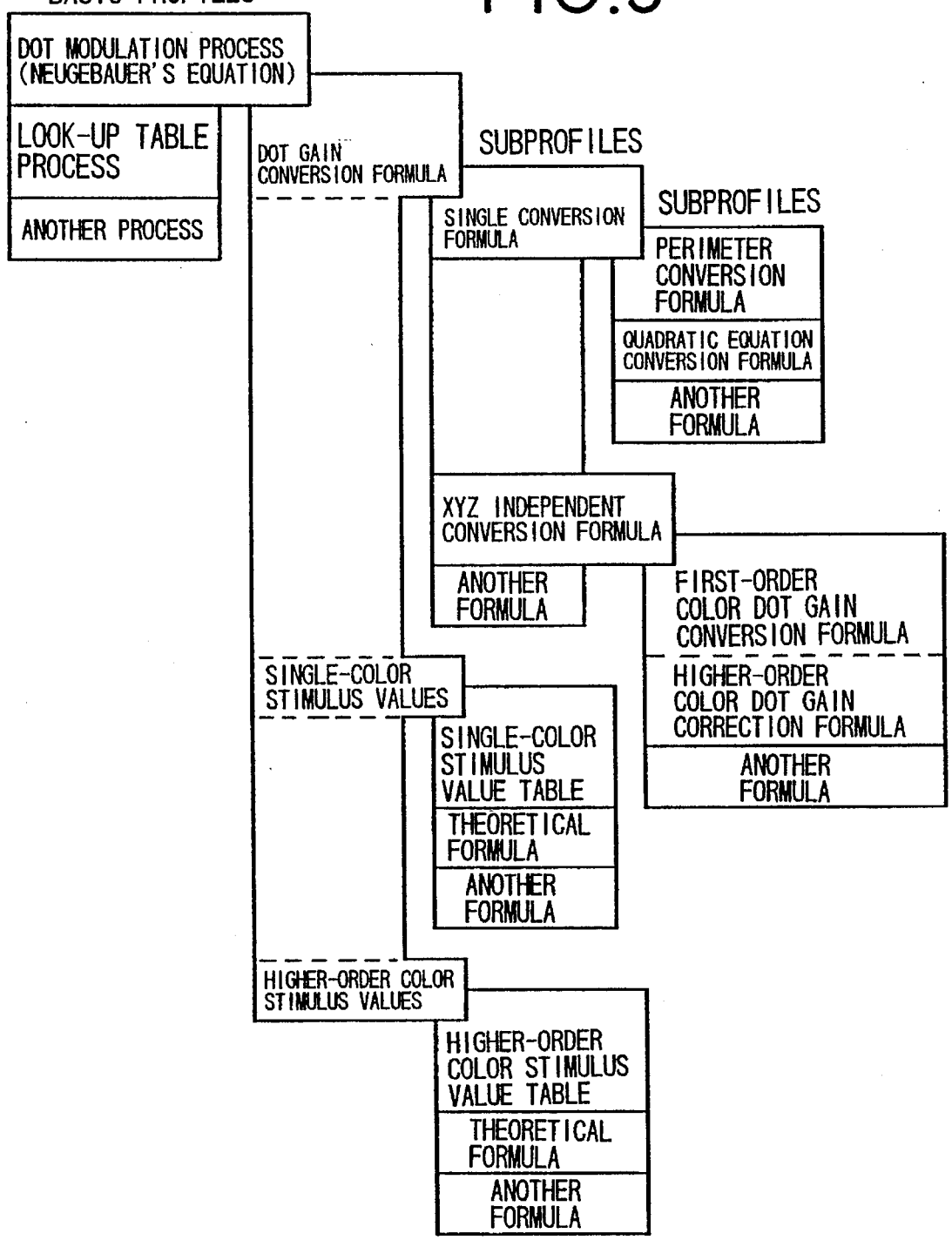
FIG. 3 is a diagram showing a hierarchical structure of basic profiles and subprofiles of an output device profile group shown in FIG. 2.

FIG. 3 shows, by way of example, the basic profiles and subprofiles of the printing/common color space conversion profile group which is defined in relation to the color reproduction process in the image output device 14B.

The basic profiles represent (1) a dot modulation process using the Neugebauer's equation, (2) a conversion process using a look-up table, and (3) another process, respectively, which can be selected one at a time. One of these basic profiles is selected depending on the color reproduction process in the image output device, 14B, and established as a color space data conversion formula for conversion between the common color space and the device color space of the image output device 14B.

The Neugebauer's equation is a color-predicting basic function which defines the relationship between the XYZ and YMCK colorimetric systems in the CIE common color space, and is defined according to the equation (1) below.

$$
\begin{aligned}
X = & X_c \cdot c_x \cdot (1 - m_x) \cdot (1 - y_x) \cdot (1 - k_x) \\
& + X_m \cdot m_x \cdot (1 - c_x) \cdot (1 - y_x) \cdot (1 - k_x) \\
& + X_y \cdot y_z \cdot (1 - c_x) \cdot (1 - m_x) \cdot (1 - k_x) \quad \text{first-order color term} \\
& + X_k \cdot k_x \cdot (1 - c_x) \cdot (1 - m_x) \cdot (1 - y_x) \\
& + X_w \cdot (1 - k_x) \cdot (1 - c_x) \cdot (1 - m_x) \cdot (1 - y_x) \\
& + X_{cm} \cdot c_{xm} \cdot m_{xc} \cdot (1 - y_x) \cdot (1 - k_x) \\
& + X_{cy} \cdot c_{xy} \cdot y_{xc} \cdot (1 - m_x) \cdot (1 - k_x) \\
& + X_{ck} \cdot c_{xk} \cdot k_{xc} \cdot (1 - m_x) \cdot (1 - y_x) \\
& + X_{my} \cdot m_{xy} \cdot y_{xm} \cdot (1 - c_x) \cdot (1 - k_x) \quad \text{second-order color term} \\
& + X_{mk} \cdot m_{xk} \cdot k_{xm} \cdot (1 - c_x) \cdot (1 - y_x) \\
& + X_{yk} \cdot (1 - c_x) \cdot (1 - m_x) \cdot y_{xk} \cdot k_{xy} \\
& + X_{cmy} \cdot c_{xmy} \cdot m_{xcy} \cdot y_{xcm} \cdot (1 - k_x) \\
& + X_{cmk} \cdot c_{xmk} \cdot m_{xck} \cdot k_{xcm} \cdot (1 - y_x) \\
& + X_{myk} \cdot m_{xyk} \cdot y_{xmk} \cdot k_{xmy} \cdot (1 - c_x) \quad \text{third-order color term} \\
& + X_{cyk} \cdot c_{xyk} \cdot y_{xck} \cdot k_{xcy} \cdot (1 - m_x) \\
& + x_{cmyk} \cdot c_{xmyk} \cdot m_{xcyk} \cdot y_{xcmk} \cdot k_{xcmy} \quad \text{fourth-order color term} \\
Y = & Y_C \cdot c_Y \cdot (1 - m_Y) \cdot (1 - y_Y) \cdot (1 - k_Y) \\
& + \ldots \\
Z = & Z_C \cdot c_Z \cdot (1 - m_Z) \cdot (1 - y_Z) \cdot (1 - k_Z) \\
& + \ldots
\end{aligned}
\quad (1)
$$

where X, Y, Z represent tristimulus values in the XYZ colorimetric system, $X_c$, $X_m$, $X_y$, $X_k$, etc. represent XYZ stimulus values (single-color stimulus values) with respect to single-color inks of Y, M, C, and K, $X_w$, etc. represent tristimulus values of the support layer of the printed material, $X_{cm}$, $X_{cmy}$, $X_{cmyk}$, etc. represent XYZ stimulus values (higher-order color stimulus values) of an area where inks are superimposed, e.g., $X_{cm}$ represents XYZ stimulus values of an area where inks of C and M are superimposed, $c_x$, $m_x$, $y_x$, $k_x$, etc. represent dot % values of inks of C, M, Y, K at the time they are observed with color light corresponding to color matching functions x(λ), and $c_{Xm}$, $c_{Xmy}$, $c_{Xmyk}$, etc. represent dot % values of an ink of C at the time it is observed with color light corresponding to the color matching functions x(λ), e.g., $c_{Xmy}$ represents a dot % value for making a correction with respect to the presence of the inks of M and Y (higher-order color dot gain correction). Since the XYZ colorimetric system has a one-to-one correspondence to the L*a*b* colorimetric system or the RGB colorimetric system, the Neugebauer's equation can also be defined as an equation indicative of the relationship between the L*a*b* colorimetric system and the YMCK colorimetric system.

Depending on the selected basic profile, there is established a subprofile in which set values can be selected according to predetermined relationship equations or output conditions. For example, if (1) the dot modulation process using the Neugebauer's equation is selected as the basic profile, then its variables are classified into (1) a dot gain conversion formula ($c_X$, $m_X$, $c_{Xm}$, $c_{Xmy}$, etc.), (2) single-color stimulus values ($X_c$, $X_m$, $X_y$, $X_k$, etc.), and (3) higher-order color stimulus values ($X_{cm}$, $X_{cmy}$, $X_{cmyk}$, etc.), and subprofiles are established for each of these sets of values. For the dot gain conversion formula, it is possible to select a desired subprofile from (1) a single conversion formula, (2) an XYZ independent conversion formula, and (3) another formula. For the single-color stimulus values, it is possible to select a desired subprofile from (1) a single-color stimulus value table, (2) a theoretical formula, and (3) another formula. For the higher-order color stimulus values, it is possible to select a desired subprofile from (1) a higher-order color stimulus value table, (2) a theoretical formula, and (3) another formula. The single conversion formula represents a process for representing and processing $c_X$, $c_y$, $c_z$, etc. with one value $c_n$ independent of X, Y, Z in the equation (1) above, and the XYZ independent conversion formula represents a process for establishing and processing $c_X$, $c_y$, $c_z$, etc. independently for each of X, Y, Z.

Depending on each of the above subprofiles, there is established a subprofile in which another relationship equation can be established. For example, with respect to the subprofile of the single conversion formula, a desired subprofile can be selected from (1) a perimeter conversion formula, (2) a quadratic equation conversion formula, and (3) another formula. With respect to the subprofile of the XYZ independent conversion formula, a desired subprofile can be selected from (1) a first-order color dot gain conversion formula, (2) a higher-order color dot gain conversion formula, and (3) another formula.

The perimeter conversion formula which can be selected with respect to the subprofile of the single conversion formula is a formula for calculating dot % values $c_X$, $c_y$, $c_z$, etc. (=$c_n$, etc.) in the case where the dot gain is considered to be proportional to the perimeter of formed dots. The perimeter conversion formula is defined by:

$$c_n = c + \alpha_p \cdot \alpha_m \cdot L \cdot \sqrt{c} \ /1500 \ (0 \leq c < 50) \quad (2)$$
$$= c + \alpha_p \cdot \alpha_m \cdot L \cdot \sqrt{100-c} \ /1500 \ (50 \leq c < 100)$$

where $\alpha_p$, $\alpha_m$ are gain coefficients, and L the screen ruling. The gain coefficient $\alpha_p$ is a parameter depending on the paper on which the color image is to be printed, and the gain coefficient $\alpha_m$ is a parameter depending on the printing press and the ink.

The quadratic equation conversion formula is a quadratic equation that calculates the dot % values $c_n$ on the printed material in view of the exposure, development, printing, and optical dispersion effect of the presensitized plates, as follows:

$$c_n = c + g - g/250 \cdot (c-50)^2 \quad (3), \text{ and}$$

$$g = g_1 + g_2 + g_3 + g_4 + g_5 \quad (4)$$

where $g_1$ is a gain coefficient which is a parameter depending on the printing press, $g_2$ is a gain coefficient which is a parameter depending on the ink, $g_3$ is a gain coefficient which is a parameter depending on the paper of the support layer of the printed material, $g_4$ is a gain coefficient which is a parameter depending on the screen ruling, and $g_5$ is a gain coefficient which is a parameter depending on the dot shape.

The first-order dot gain conversion formula which can be selected with respect to the XYZ independent conversion formula sets the gain coefficient $\alpha_p$ in the equation (2) to $\alpha_{pX}$, $\alpha_{py}$, $\alpha_{pz}$ independently for the respective stimulus values of X, Y, Z and also sets the dot % value $c_X$, for example, as:

$$c_X = c + \alpha_{pX} \cdot \alpha_m \cdot L \cdot \sqrt{c} \ /1500 \ (0 \leq c < 50) \quad (5)$$
$$= c + \alpha_{pX} \cdot \alpha_m \cdot L \cdot \sqrt{100-c} \ /1500 \ (50 \leq c < 100)$$

with respect to the perimeter conversion formula, and sets the dot % value $c_X$ as:

$$c_X = c + g - g/250 \cdot (c-50)^2 \quad (6)$$

based on the equation (3) with respect to the quadratic equation conversion formula.

The higher-order color dot gain conversion formula sets the dot % value $c_{Xy}$, for example, as:

$$c_{Xy} = c_X - a_{cXy} \cdot y_X^2 + b_{cXy} \cdot y_X \quad (7)$$

where $a_{cXy}$, $b_{cXy}$ are higher-order color dot gain correction parameters, with respect to the dot % values of the second- and higher-order color term in the equation (1).

Figure 4:
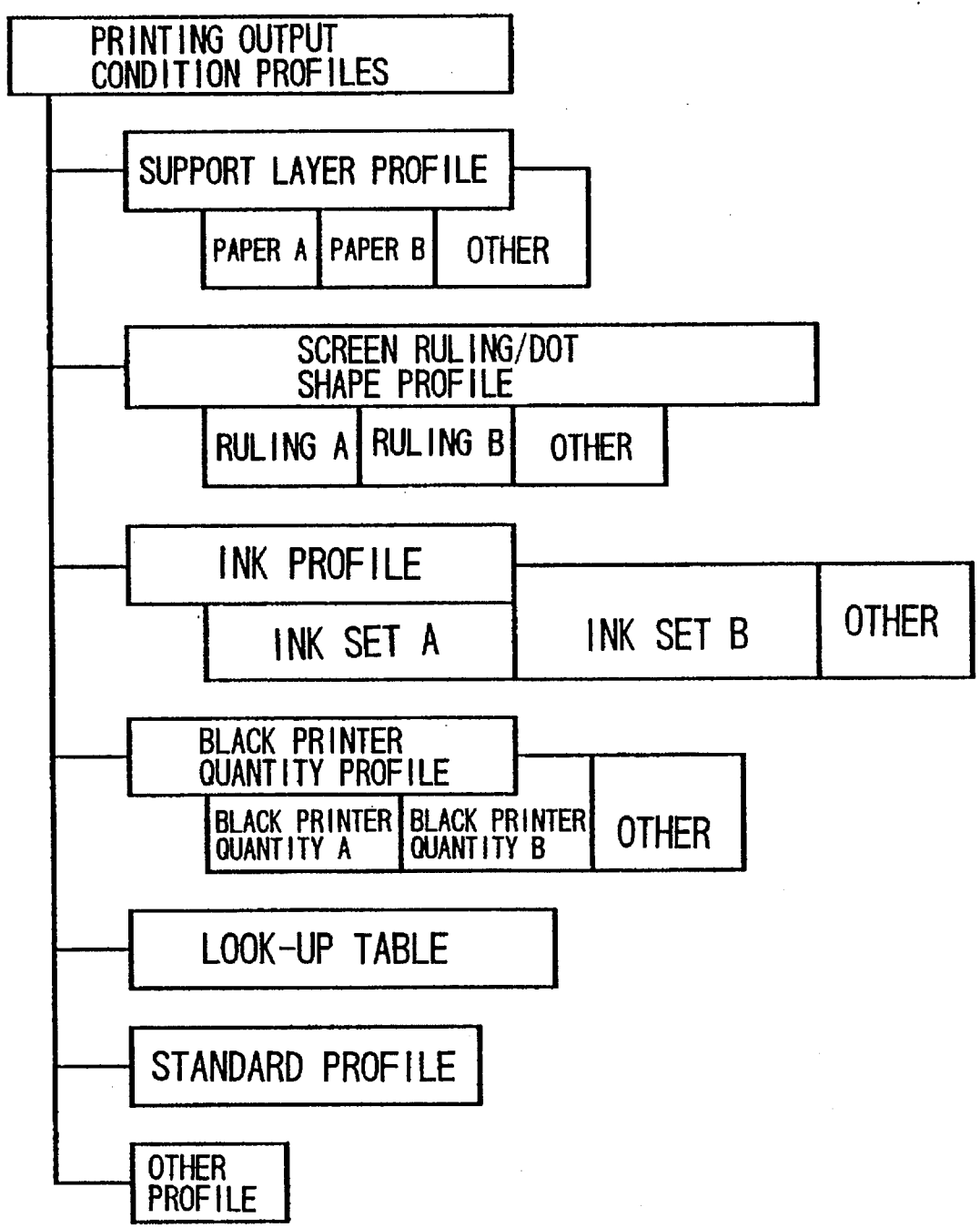
FIG. 4 is a diagram showing condition profiles of a printing/common color space conversion profile group shown in FIG. 2.

FIG. 4 shows printing output condition profiles of the printing/common color space conversion profile group shown in FIG. 2. The printing output condition profiles represent output conditions used for producing a printed material. The printing output condition profiles are composed of a support layer profile for defining parameters ($\alpha_p$, $\alpha_{pX}$, $\alpha_{py}$, $\alpha_{pz}$, $g_3$, $a_{cXy}$, $b_{cXy}$, etc.) relative to the paper of the support layer of the printed material, a screen ruling/dot shape profile for defining parameters (L, $g_4$, etc.) relative to the screen ruling and the dot shape, an ink profile for defining parameters ($g_2$, $\alpha_m$, a single-color stimulus value table, a higher-order color stimulus value table, theoretical formula parameters, etc.) relative to the characteristics of inks used in the printing, a black printer quantity profile for defining parameters (p, k, etc.) relative to a black printer quantity (described later on), a look-up table to be referred to when the look-up table formula is selected from the basic profiles shown in FIG. 3, a standard profile for defining average parameters with respect to parameters not defined in the above profiles, and other profiles (including those relative to the printing press).

The look-up table may be established in advance by solving the Neugebauer's equation (1) based on a combination of plural standard profiles set from the printing output condition profiles shown in FIG. 4. Where the existing look-up table thus established is used, it is possible to carry out higher processing than if the Neugebauer's equation is solved each time image processing is carried out.

Figure 5:
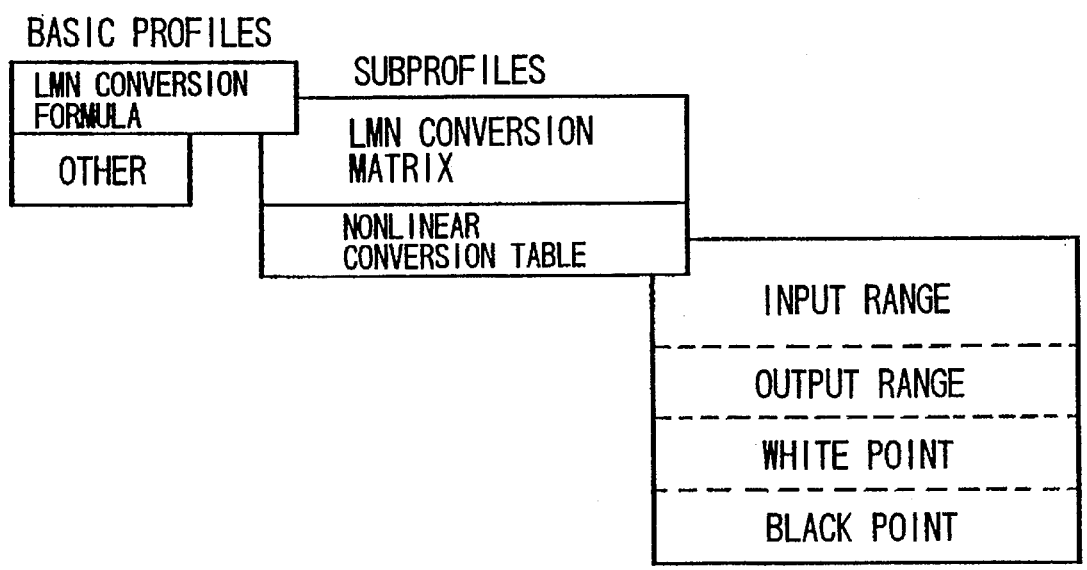
FIG. 5 is a diagram showing a hierarchical structure of basic profiles and subprofiles of a gamut mapping/appearance conversion profile group shown in FIG. 2.

Similarly, as shown in FIG. 5, the gamut mapping/appearance conversion profile group is composed of basic profiles representing (1) an LMN conversion process based on a combination of nonlinear conversion and 3×3 matrix conversion and (2) another process, one of which can be selected at a time, and subprofiles representing (1) an LMN conversion matrix, (2) a nonlinear conversion table, and (3) another table, one of which can be selected at a time with respect to the LMN conversion process. Variables relative to (1) an input range, (2) an output range, (3) a white point, and (4) a black point are established with respect to the nonlinear conversion table, using the parameters of the condition profiles of the printing/common color space conversion profile group, the gamut mapping/appearance conversion profile group, and the output device profile group (see "Reference Manual for Postscript", 2nd edition, published by ASCII Publishing Department).

Figure 6:
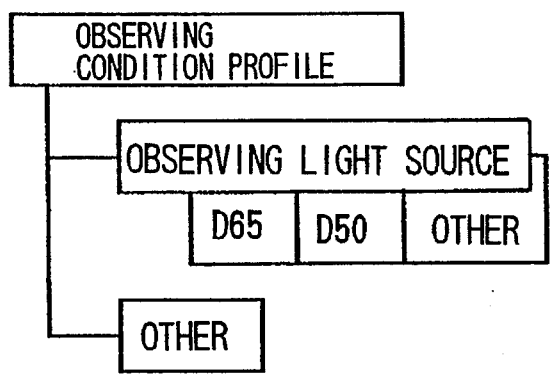
FIG. 6 is a diagram of condition profiles of the gamut mapping/appearance conversion profile group shown in FIG. 2.

If the image output unit 14A is a color printer, then observing conditions of the gamut mapping/appearance conversion profile group are arranged as shown in FIG. 6. The observing conditions include parameters relative to an observing light source, and other parameters.

Figure 7:
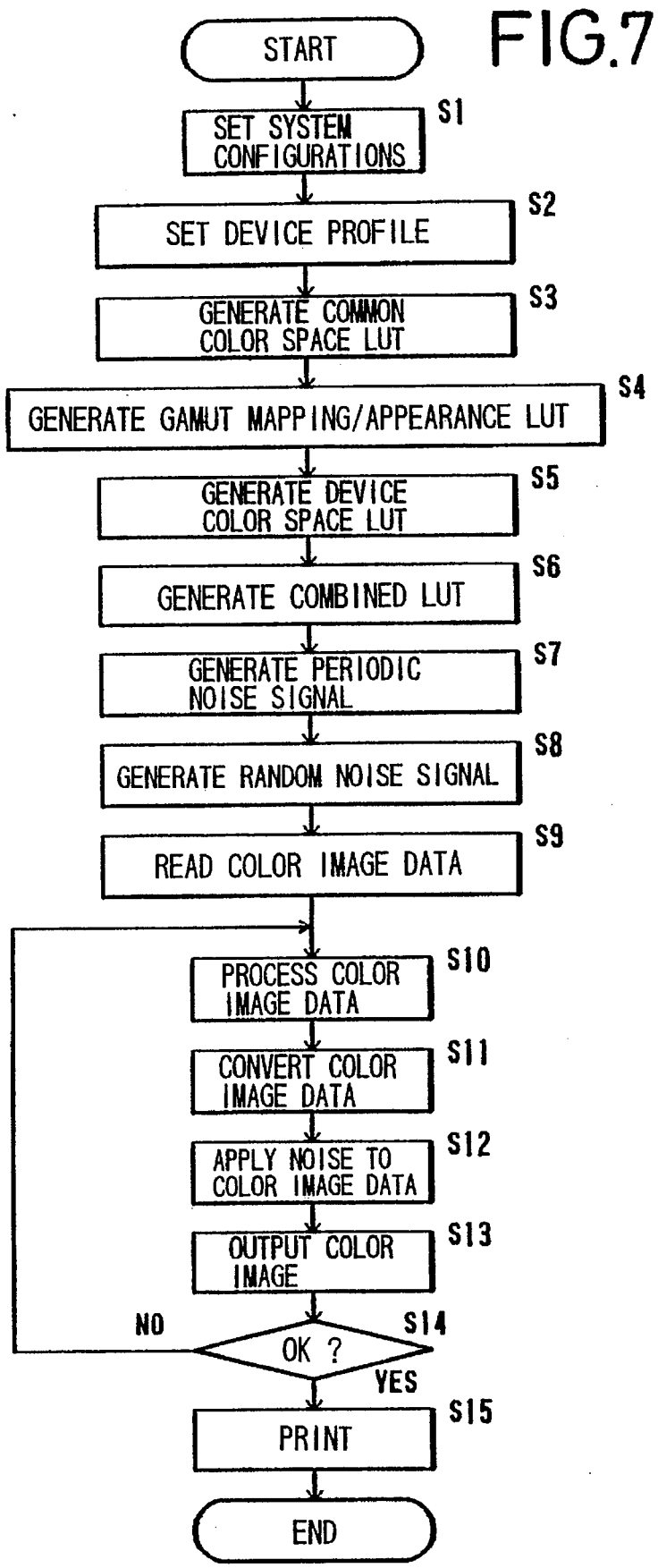
FIG. 7 is a flowchart of a processing sequence of the color image reproducing system shown in FIG. 1.

Data processing operation of the color image reproducing system according to the first embodiment of the present invention will be described below with reference to FIG. 7.

First, the operator determines system configurations including the image output unit 14B, the type of an original document on which a color image is recorded, an output medium, the type of inks used for recording a color image, and an output format, etc. in a step S1.

After the image output unit 14B and other types are determined, the device profiles shown in FIGS. 3 through 6 are established using the device profile generator 18 in a step S2. These device profiles may be determined in advance depending on given devices before the system configurations of the color image reproducing system are determined.

After the system configurations and the device profiles are determined, a common color space LUT for converting YMCK halftone dot percentage data from the image editor 12 into data in a common color space is generated in the common color space converter 20 in a step S3. At this time, the selection of basic profiles and subprofiles depends on whether the parameters relative to these profiles are prepared in the condition profiles and whether these profiles are profiles which can cope with a requested processing speed. Therefore, not all the profiles are freely selected by the operator, but some of them are limited by prepared profiles. If no desired profiles have been established, then default values are selected.

The common color space LUT generator 20 of the image processor 16 successively selects a desired color reproduction process, etc., from the printing/common color space conversion profile group shown in FIGS. 3 and 4, and generates a common color space LUT corresponding to the image output unit 14B for producing a printed material based on the selected color reproduction process, etc. in the step S3. The generated common color space LUT is stored in the data file 34.

To obtain a desired printed material from the image output unit 14B, a color reproduction process of the image output unit 14B is specified, and a basic formula depending on a desired accuracy and processing speed is selected.

If the image output unit 14B is of the dot modulation output type, then the Neugebauer's equation which defines the relationship between the XYZ colorimetric system and the YMCK colorimetric system in the CIE common color space is selected as a color-predicting basic function from the basic profiles shown in FIG. 3. The Neugebauer's equation according to the equation (1) has variables classified into (1) the dot gain conversion formula ($c_X$, $m_X$, $c_{Xm}$, $c_{Xmy}$, etc.), (2) the single-color stimulus values ($X_c$, $X_m$, $X_y$, $X_k$, etc.), and (3) the higher-order color stimulus values ($X_{cm}$, $X_{cmy}$, $X_{cmyk}$, etc.), and desired subprofiles are selected for each of these sets of variables.

If the single conversion formula and the perimeter conversion formula are selected from the subprofiles with respect to the dot gain conversion formula, then the $c_X$, $m_X$, $c_{Xm}$, $c_{Xmy}$, etc. are replaced by the corrective formula according to the equation (2), and the parameters $\alpha_p$, $\alpha_m$, L thereof are given by the support layer profile and the ink profile of the printing output condition profiles shown in FIG. 4. The parameter $\alpha_p$ is a variable depending on the paper on which a color image is to be printed. Typically, the parameter $\alpha_p$ is set to 13 for art paper, 16 for coat paper, and 20 for wood-free paper. The parameter $\alpha_m$ is a variable depending on the inks, and is set to 1 for average offset printing, and 1 or less when inks or printing conditions with a low dot gain are selected.

If the quadratic equation conversion formula is selected from the subprofiles with respect to the single conversion formula, then the $c_X$, $m_X$, $c_{Xm}$, $c_{Xmy}$, etc. are replaced by the corrective formulas according to the equations (3) and (4), and the gains coefficients $g_1$–$g_5$ as their parameters are given by the support layer profile, the screen ruling/dot shape profile, and the ink profile of the printing output condition profiles shown in FIG. 4.

The single conversion formula is employed for approximation when a common dot % value is used with respect to the X, Y, Z stimulus values. If different dot % values are used to correspond to the respective stimulus values X, Y, Z, then the accuracy of tristimulus values X, Y, Z that are obtained can further be increased. At this time, the $c_X$, $m_X$, etc. are replaced by the corrective formulas according to the equation (5) or (6), and the $c_{Xm}$, $c_{Xmy}$, etc. are replaced by the corrective formula according to the equation (7). The parameters $\alpha_{pX}$, $\alpha_{py}$, $\alpha_{pz}$, $\alpha_m$, L, $a_{cXy}$, $b_{Xxy}$, the gain coefficients $g_1$–$g_5$ are given by the support layer profile, the screen ruling/dot shape profile, and the ink profile of the printing output condition profiles shown in FIG. 4.

If the single-color stimulus value table and the higher-order color stimulus value table are selected with respect to the single-color stimulus values and the higher-order color stimulus values, then tables relative to a given ink set and a given support layer are selected from the ink profile. If data of an ink set used in the printing output condition profile are not registered, then default values are selected from the standard profile.

As described above, the parameters of the Neugebauer's equation according to the equation (1) are determined, and tristimulus values X, Y, Z are determined from the outputted dot % values using this conversion formula.

The gamut mapping/appearance LUT generator 22 of the image processor 16 successively selects a desired color reproduction process, etc. from the gamut mapping/appearance conversion profile group shown in FIGS. 5 and 6, and equalizes the gamut mapping of the image output unit 14B in the common color space with the gamut mapping of the image output unit 14A in the common color space based on the selected color reproduction process, etc., and generates a gamut mapping/appearance LUT for equalizing appearances corresponding to the visual adaptation in a step S4. In the generation of the gamut mapping/appearance conversion table, parameters corresponding to the observing light source are given from the observing condition profiles shown in FIG. 6 if the image output unit 14A is a color printer.

The gamut mapping/appearance LUT is generated according to the selected process as follows: For example, the LMN conversion formula suitable for the observing conditions with respect to the printed material and the type of the color image data is selected from the basic profiles, and the nonlinear LUT is selected from the subprofiles for conversion from the L*a*b* colorimetric system into the LMN colorimetric system. The nonlinear LUT is corrected with respect to the gamut mapping (the input range, the output range, etc.) and differences between observing conditions/color temperatures, and a conversion from the LMN colorimetric system into an L*M*N* colorimetric system is carried out. Finally, an inverse conversion from the L*M*N* colorimetric system into the Lab colorimetric system is effected. An LUT for conversion from the L*a*b* colorimetric system into the Lab colorimetric system is stored as a gamut mapping/appearance LUT in the data file 36.

Then, the device color space LUT generator 24 of the image processor 16 generates a device color space LUT for converting color image data in the common color space into color image data in the device color space of the image output unit 14A, and stores the generated device color space LUT in the data file 38 in a step S5. The device color space LUT is composed of a plurality of tables for correcting color densities according to the simulated periodic noise table established by the periodic noise applying unit 30 and the simulated random noise table established by the random noise applying unit 32. A known process using a look-up table is available for the conversion from color image data in the XYZ colorimetric system into color image data in the colorimetric system of a color printer or a CRT. For example, such a process is disclosed in "Printing CIELab imaging on CMYK printing", SPIE Vol. 1670 P316 (1992). If a plurality of output units including a color printer, a CRT, etc., are available, then it is possible to switch between a plurality of LUTs.

The common color space LUT, the gamut mapping/appearance LUT, and the device color space LUT which have thus been generated are combined by the LUT combiner/converter 26, or stored as individual image LUTs in the data file 40 in a step S6.

The periodic noise applying unit 30 and the random noise applying unit 32 generate simulated noise signals for reproducing, in the image output unit 14A, periodic noise and random noise in a printed image which will be outputted by the image output unit 14B.

The periodic noise is of a periodic image structure such as a moiré or rosette pattern that appears in a printed image. The image output unit 14B which produces a printed image by way of area modulation of halftone dots or the like establishes and outputs certain angles with respect to halftone dots of respective color plates of Y, M, C, K in order to minimize any moiré or rosette pattern when it prints a color image, for example. However, it is impossible to completely eliminate any moiré or rosette pattern. The image output unit 14A which comprises a color printer, a CRT, or the like does not produce any moiré or rosette pattern in principle because it reproduces a color image by way of density modulation. Therefore, in order to bring the appearance of an image outputted by the image output unit 14B and the appearance of an image outputted by the image output unit 14A into coincidence with each other, it is necessary to apply periodic noise representative of any moiré or rosette pattern to the image outputted by the image output unit 14A. Such a noise applying process is very important particularly if the operator wants to confirm an image that requires uniform image quality such as of the skin of a person, the space of skies, or the like before the image is printed.

More specifically, an image representing one color throughout a certain area, such as of the skin of a person, the space of skies, or the like, indicates one value in the processing in the LUT combiner/converter 26. When such an image is outputted as a printed image on an actual printed material, periodic noise caused by halftone dots or periodic noise generated in platemaking and printing steps is superimposed on the image. For equalizing the appearance of a corresponding image produced by the image output unit 14A to the appearance of such a printed image with superimposed periodic noise, the image data processed by the LUT combiner/converter 26 are modified by the noise simulator 28 depending on the two-dimensional arrangement thereof, i.e., converted by being multiplied by a certain coefficient.

Figure 8A:
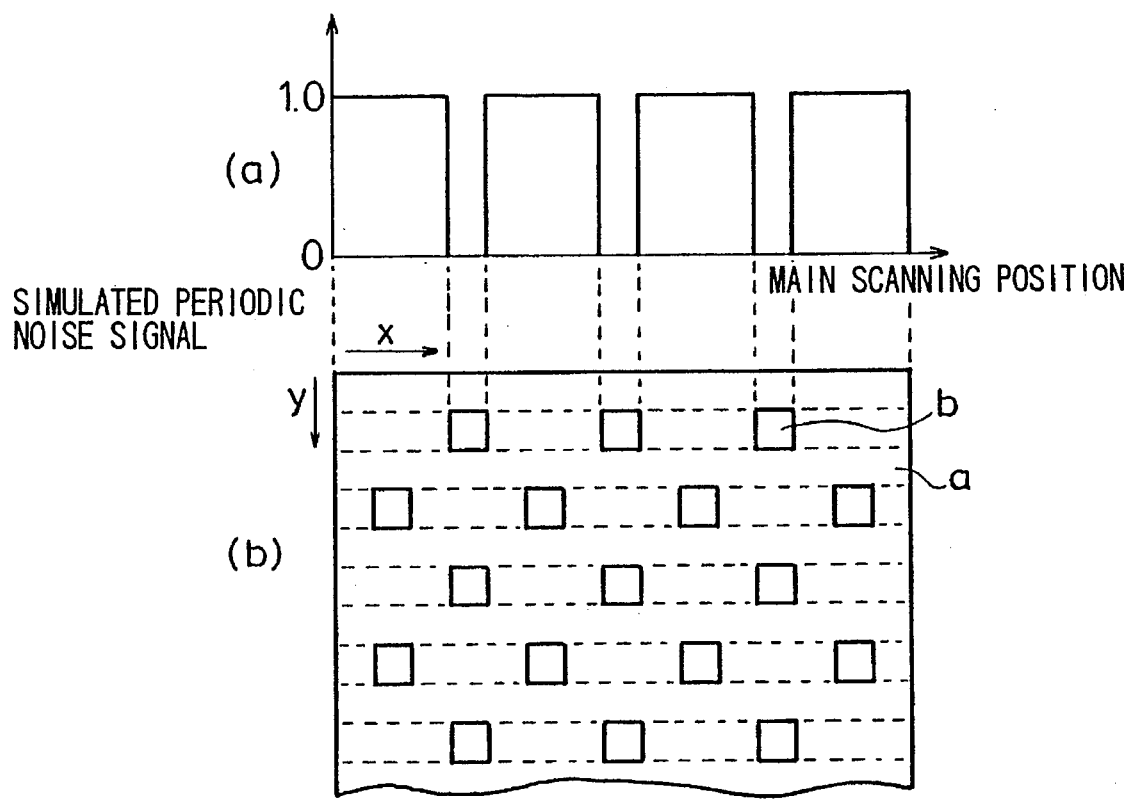
FIG. 8A is a diagram illustrative of a simulated periodic noise signal generated by a noise simulator in an image processor shown in FIG. 1.
Figure 8B:
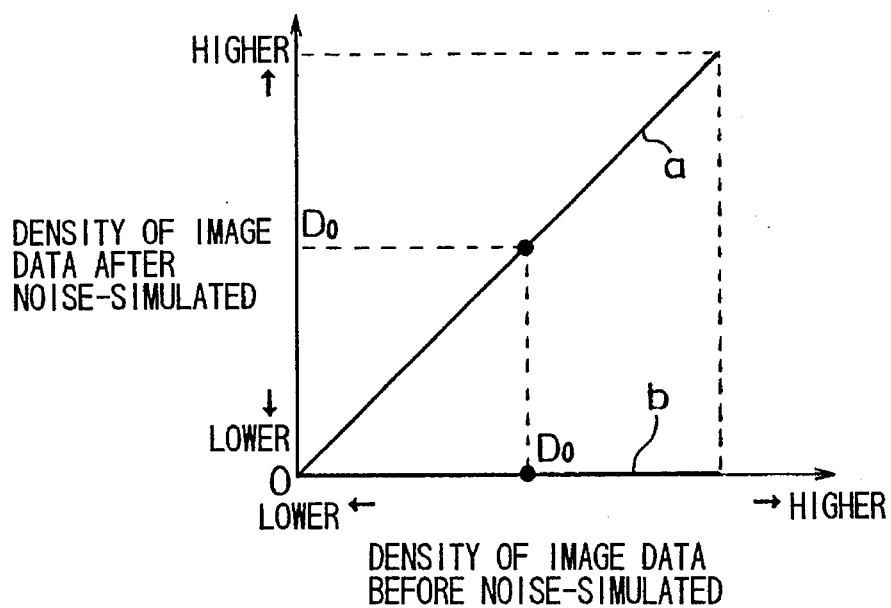
FIG. 8B is a diagram showing the relationship between image data before noise-simulated and image data after noise-simulated using the simulated periodic noise signal shown in FIG. 8A.

The periodic noise may be imposed using a periodic noise template. One periodic noise template is shown by way of example in FIG. 8A. The periodic noise template represents an appearance-affecting portion of a moiré or rosette pattern that is generated by a combination of halftone dots. Using the periodic noise template, the image data are modified depending on the two-dimensional arrangement (in x, y directions) of the image. Regions "a" in the periodic noise template shown in FIG. 8A are regions ($D_0=D_0$) where the value of image data is not varied, and regions "b" are regions ($D_0=0$) where the output value is set to "0" irrespective of the value of image data. Therefore, the periodic noise template achieves noise approximation by providing periodic white spots in the image. The image data in the regions "a", "b" are represented in a graph as shown in FIG. 8B.

Figure 9A:
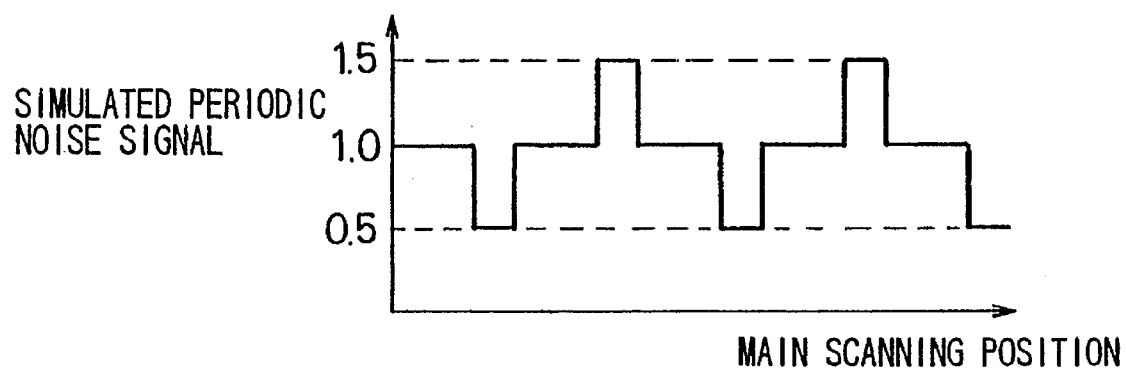
FIG. 9A is a diagram illustrative of another simulated periodic noise signal generated by the noise simulator in the image processor shown in FIG. 1.
Figure 9B:
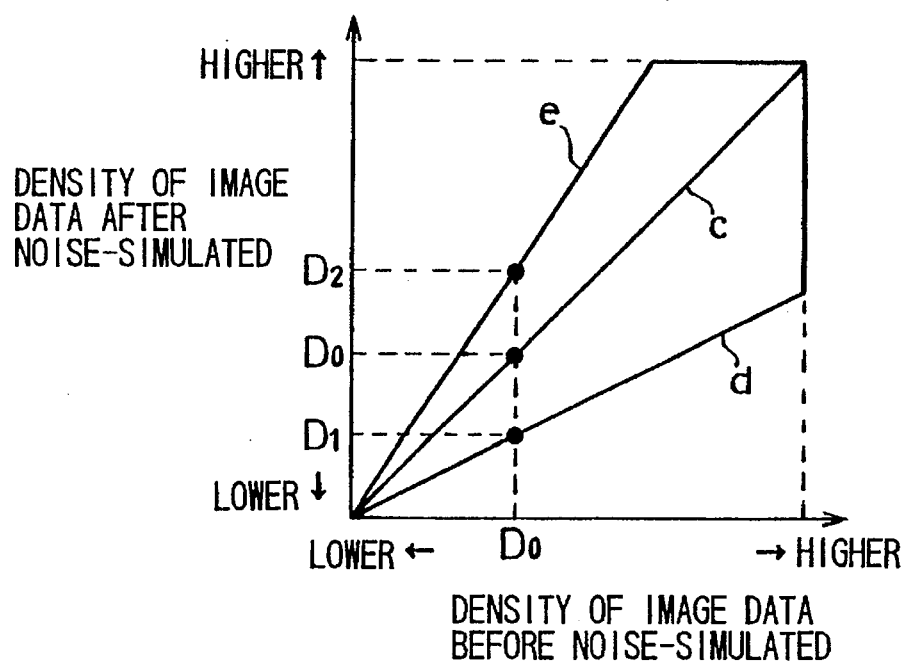
FIG. 9B is a diagram showing the relationship between image data before noise-simulated and image data after noise-simulated using the simulated periodic noise signal shown in FIG. 9A.

FIGS. 9A and 9B show another periodic noise template which are divided into regions "c" ($D_0=D_0$) where the image data are outputted as they are, regions "d" ($D_0=D_1$) where the image data are multiplied by ½ and then outputted, and regions "e" ($D_0=D_2$) where the image data are multiplied by 1.5 and then outputted.

Figure 10:
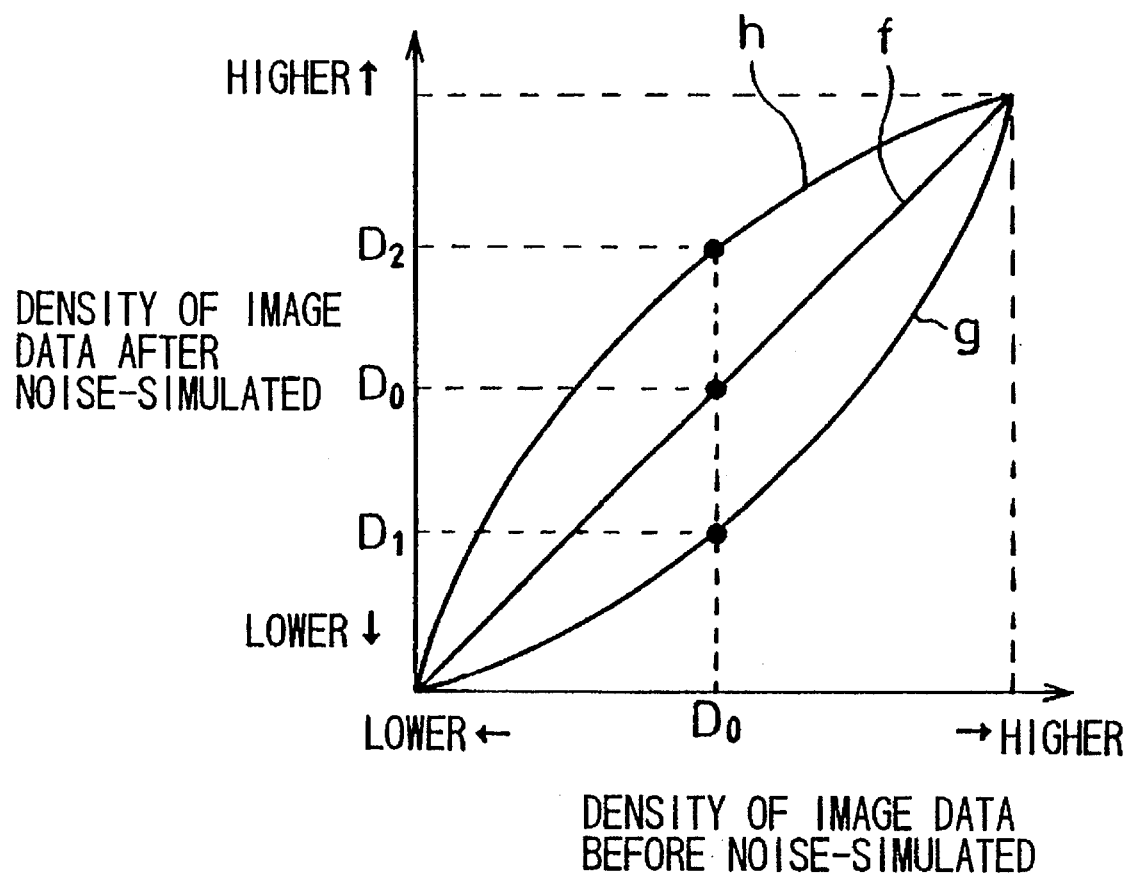
FIG. 10 is a diagram showing the relationship between image data before noise-simulated and image data after noise-simulated using a simulated periodic noise signal generated by the noise simulator in the image processor shown in FIG. 1.

In view of the fact that the periodic noise is prominent in an intermediate density range where the halftone dot percentage is close to 50%, it is possible to employ a density correcting table (see FIG. 10) for adjusting the correcting quantity depending on the density of image data in order to increase the noise approximation.

Since the periodic noise depends on the screen ruling, dot shape, dot angle, etc. of a printed image, a template or density correcting table is selected based on the data established in the printing output condition profiles shown in FIG. 4, and a simulated periodic noise signal is generated in a step S7 and stored in the data file 42.

The random noise is a noise that appears in a printed image due to irregular application of inks to the recording medium, indefinite status variations of the printing press, the characteristics of random dots generated by an error dispersion process which is a kind of process of generating a halftone dot image, etc. The random noise is usually recognized as harshness of the image. A plurality of sets of artificial random noise depending on these characteristics are prepared and added as noise data to image data.

The random noise depends on the printing method, the printing speed, the smoothness of print paper, the type of ink, the screen ruling, the dot pattern, etc. A noise signal is generated as random noise based on the data established in the printing output condition profiles shown in FIG. 4 in a step S8, and stored in the data file 44. The noise signal can easily be generated by a known random number generator which digitally generates random numbers, or a known random number generator which employs avalanche noise produced by a zener diode.

After the above preparatory process has been completed, the operator operates the image input unit 10 to read color image data of a color original document in a step S9. The image input unit 10 supplies the color image data as RGB data, for example, to the image editor 12, which effects desired image processing on the RGB data, and supplies the processed RGB data as YMCK halftone dot percentage data to the image processor 16 and the image output unit 14B in a step S10.

The image processor 16 converts the YMCK halftone dot percentage data supplied from the image editor 12 with the LUT that has been established by the LUT combiner/converter 26 with respect to the image output units 14A, 14B in a step S11. Specifically, the LUT combiner/converter 26 converts the YMCK halftone dot percentage data into tristimulus values X, Y, Z in the common color space with the common color space LUT which defines the Neugebauer's equation (1) taking printing conditions into account, thereafter adjusts the tristimulus values into data having gamut mappings and appearances of the image output units 14A, 14B with the gamut mapping/appearance LUT, and converts the adjusted data into color image data corresponding to the image output unit 14A with the device color space LUT. The device color space LUT may be adjusted in advance based on the data established in the printing output condition profiles in order to correct color densities of the color image data which will vary in the noise simulating process in the noise simulator 28.

To the color image data converted by the LUT combiner/converter 26, there are added periodic noise and random noise by the noise simulator 28 in a step S12. When the color image data are thus modified, i.e., particularly when the color image data are modified by adding periodic noise represented by the simulated periodic noise signal shown in FIG. 8A, the overall density of the produced color image data is lowered. However, such a reduction in the density may be adjusted in advance by the device color space LUT which is selected based on the printing output condition profiles by the device color space LUT generator 24, so that the density of a simulated image finally outputted from the image output unit 14A will not be lowered.

If the printed image outputted from the image output unit 14B is of such a screen ruling that any moire or rosette pattern can be ignored, then the color image data may not be modified by the periodic noise applying unit 30. The color image data may not be modified by the random noise applying unit 32 depending on the characteristics of the image output unit 14B.

The color image data thus obtained are then outputted as a hard copy or displayed on the CRT by the image output unit 14A in a step S13. The operator confirms the outputted/displayed simulated color image in a step S14. If the operator sees no problem with respect to colors, etc., then the operator operates the image output unit 14B to produce a printed material in a step S15. If there is a problem, then the color image data are processed again in the image editor 12, printing conditions are modified, if necessary, and produced YMCK halftone dot percentage data are monitored repeatedly in the step S14.

Figure 11:
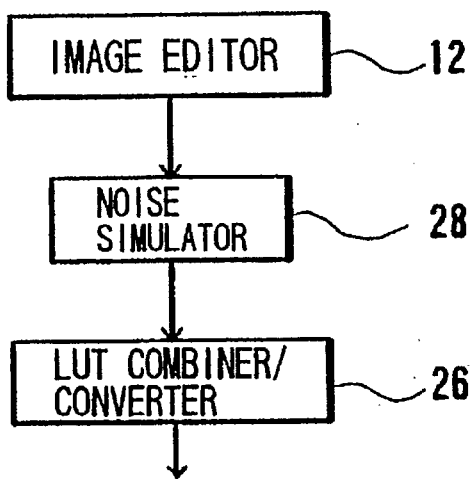
FIG. 11 is a block diagram of another arrangement in which the noise simulator is connected in the image processor shown in FIG. 1.
Figure 12:
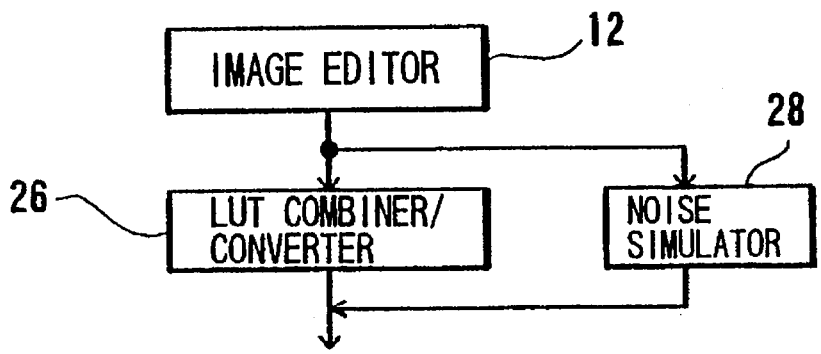
FIG. 12 is a block diagram of still another arrangement in which the noise simulator is connected in the image processor shown in FIG. 1.

In the above embodiment, as described above, the color image data are noise-simulated after they have been converted by the LUT combiner/converter 26. However, as shown in FIG. 11, the color image data supplied from the image editor 12 may first be modified by the noise simulator 28, and the noise-simulated color image data may thereafter be converted by the LUT combiner/converter 26. Alternatively, as shown in FIG. 12, the color image data supplied from the image editor 12 may simultaneously be converted by the LUT combiner/converter 26 and modified by the noise simulator 28, and the converted and noise-simulated color image data may be added to each other.

In the first embodiment, as described above, since periodic noise such as a moire or rosette pattern that appears in a printed image outputted from the image output unit 14B or random noise that is produced in a printed image outputted from the image output unit 14B during the printing process can be added as a simulated noise signal to color image data and reproduced, equivalent images can be produced from output systems having different output methods, resolutions, and output conditions. Therefore, it is possible to predict a printed image highly accurately before the printed image is actually produced.

A color image reproducing system as an image reproducing apparatus according to a second embodiment of the present invention will be described below with reference to FIG. 13. Those parts shown in FIG. 13 which are identical to those shown in FIG. 1 are denoted by identical reference numerals, and will not be described in detail below.

The color image reproducing system shown in FIG. 13 includes an image processor 50 having a first noise simulator 56 comprising a periodic noise applying unit 52 and a contrast adjusting unit 54 for adjusting density variations in a reproduced image which are caused by application of periodic noise, and a second noise simulator 62 comprising a random noise applying unit 58 and a contrast adjusting unit 60 for adjusting density variations in a reproduced image which are caused by application of random noise. According to the second embodiment, at the same time that LUTs are successively generated by a common color space LUT generator/converter 20A, a gamut mapping/appearance LUT generator/converter 22A, and a device color space LUT generator/converter 24A, image data are converted and noise-simulated.

The periodic noise applying unit 52 is connected to a data file 64 which stores a plurality of periodic noise templates $T_1$ depending on pixel positions established according to output conditions including a screen ruling, a screen angle, etc. supplied from the device profile generator 18. The random noise applying unit 58 is connected to a data file 66 which stores a plurality of random noise templates $T_2$ established according to the output conditions for reproducing random noise that will be caused depending on a recording medium, a printing press, a method of generating a halftone dot image, etc. Each of the periodic noise templates $T_1$ can be determined, for example, as the difference between average colorimetric values and microscopic colorimetric values of an image which is outputted from the image output unit 14B and has a halftone dot percentage which is close to 50% where the periodicity is prominent. Since it is known that random noise increases in a certain density range such as a density range where halftone dots first start to be applied to a recording medium, a density range where halftone dots start being joined to each other, or the like, each of the random noise templates $T_2$ can be determined by measuring random noise in such a density range under each output condition.

The contrast adjusting unit 54 is connected to a data file 68 which stores contrast adjusting data as LUTs depending on respective common color space data $X_0$, $Y_0$, $Z_0$, for adjusting contrasts which vary depending on the periodic noise with respect to the respective common color space data $X_0$, $Y_0$, $Z_0$. The contrast adjusting unit 60 is connected to a data file 70 which stores contrast adjusting data as LUTs depending on the respective common color space data $X_0$, $Y_0$, $Z_0$, for adjusting contrasts which vary depending on the random noise with respect to the respective common color space data $X_0$, $Y_0$, $Z_0$. These LUTs can be determined in the same manner as periodic noise templates $T_1$.

YMCK halftone dot percentage data supplied from the image editor 12 are converted into common color space data $X_0$, $Y_0$, $Z_0$ by the common color space LUT generator/converter 20A, using the Neugebauer's equation (1) or an LUT selected from the printing output condition profiles shown in FIG. 4 based on given output conditions.

The common color space data $X_0$, $Y_0$, $Z_0$ are supplied to the contrast adjusting units 54, 60. The contrast adjusting units 54, 60 select LUTs stored in the data files 68, 70 according to the parameters of output conditions supplied from the device profile generator 18, determine first and second contrast adjusting parameters $P_{x1}$, $P_{y1}$, $P_{z1}$ and $P_{x2}$, $P_{y2}$, $P_{z2}$ for adjusting the contrasts of the respective colors of the common color space data $X_0$, $Y_0$, $Z_0$ according to the selected LUTs, and supply the determined first and second contrast adjusting parameters $P_{x1}$, $P_{y1}$, $P_{z1}$ and $P_{x2}$, $P_{y2}$, $P_{z2}$ to respective multipliers 72, 74. The periodic noise applying unit 52 selects one of the periodic noise templates $T_1$ depending on the parameters of output conditions from the data file 64 and supplies the selected periodic noise template $T_1$ to the multiplier 72. The random noise applying unit 58 selects one of the random noise templates $T_2$ depending on the parameters of output conditions from the data file 66 and supplies the selected random noise template $T_2$ to the multiplier 74. The respective products from the multipliers 72, 72 are then added to the common color space data $X_0$, $Y_0$, $Z_0$ by respective adders 76, 78. The common color space data $X_0$, $Y_0$, $Z_0$ supplied from the common color space LUT generator/converter 20A are thus corrected into common color space data X, Y, Z, respectively, as follows:

$$\begin{pmatrix} X \\ Y \\ Z \end{pmatrix} = \begin{pmatrix} X_0 \\ Y_0 \\ Z_0 \end{pmatrix} + T_1 \cdot \begin{pmatrix} P_{X1} \\ P_{Y1} \\ P_{Z1} \end{pmatrix} + T_2 \cdot \begin{pmatrix} P_{X2} \\ P_{Y2} \\ P_{Z2} \end{pmatrix}. \quad (8)$$

The common color space data X, Y, Z are supplied to the gamut mapping/appearance LUT generator/converter 22A.

The gamut mapping and appearance of the noise-simulated common color space data X, Y, Z are adjusted by the gamut mapping/appearance LUT generator/converter 22A. Thereafter, the common color space data X, Y, Z are converted into device color space data matching the image output unit 14A by the device color space LUT generator/converter 24A. The converted device color space data are supplied from the device color space LUT generator/converter 24A to the image output unit 14A. The image output unit 14A outputs a reproduced image based on the supplied device color space data.

The reproduced image contains artificially reproduced periodic noise and random noise that will be produced in a finally generated image outputted from the image output unit 14B. Inasmuch as contrast variations caused by the artificially added periodic noise and random noise have been adjusted for each of the colors of the image data, the appearance of the reproduced image, which includes colors, is equalized highly accurately to the appearance of the finally generated image outputted from the image output unit 14B. Because the noise simulating process in each of the first and second noise simulators 56, 62 is carried out in the common color space of an XYZ colorimetric system which is linear with respect to the luminance, the additivity of colors in the processing represented by the equation (8) is satisfied, and any color change due to the noise simulation is not caused.

While the common color space data in the second embodiment are represented in the XYZ colorimetric system, they may be represented in another colorimetric system such as a BGR colorimetric system which maintains linearity with respect to the luminance.

Although certain preferred embodiments of the present invention has been shown and described in detail, it should be understood that various changes and modifications may be made therein without departing from the scope of the appended claims.

What is claimed is:

1. A color image reproducing system for predicting the appearance of an output image with a simulated image, said simulated image produced on a monitor from image data prior to generating said output image from said image data, said system comprising:

output condition storing means for selectively storing output conditions including an output method and an output medium for said output image; and noise simulating means, responsive to an output of said output condition storing means, for simulating irregularities of said output image in said simulated image, and producing noise according to output conditions specified for said output image, said noise modifying said image data to produce said simulated image.

2. A system according to claim 1, further comprising image converting means for converting said image data to produce color characteristics of said output image in said simulated image according to said output conditions specified for said output image in said output condition storing means, wherein said simulated image comprises results of said noise simulating means and said image converting means.

3. A system according to claim 1 or 2, wherein said noise simulating means comprises data means for producing data representative of periodic noise.

4. A system according to claim 3, wherein said data means comprises a template for establishing a density correcting process, and said periodic noise is produced in said simulated image by performing said density correcting process at each position of pixels.

5. A system according to claim 4 further comprising a contrast adjusting means for producing contrast data depending on said periodic noise and said density correcting process is performed by superimposing data produced by said template and by said contrast adjusting means.

6. A system according to claim 1 or 2, wherein said noise simulating means comprises data means for producing data representative of random noise as noise data.

7. A system according to claim 5, wherein said data representative of random noise are generated by multiplying said contrast data by random numbers generated by a random-number generator.

8. A system according to claim 1 or 2, wherein said noise simulating means comprises data means for producing data representative of periodic noise and random noise.

\* \* \* \* \*